Sept. 3, 1929.  A. T. TOTTENHAM ET AL  1,726,685
FRUIT PITTING MACHINE
Filed Jan. 20, 1927   7 Sheets-Sheet 1
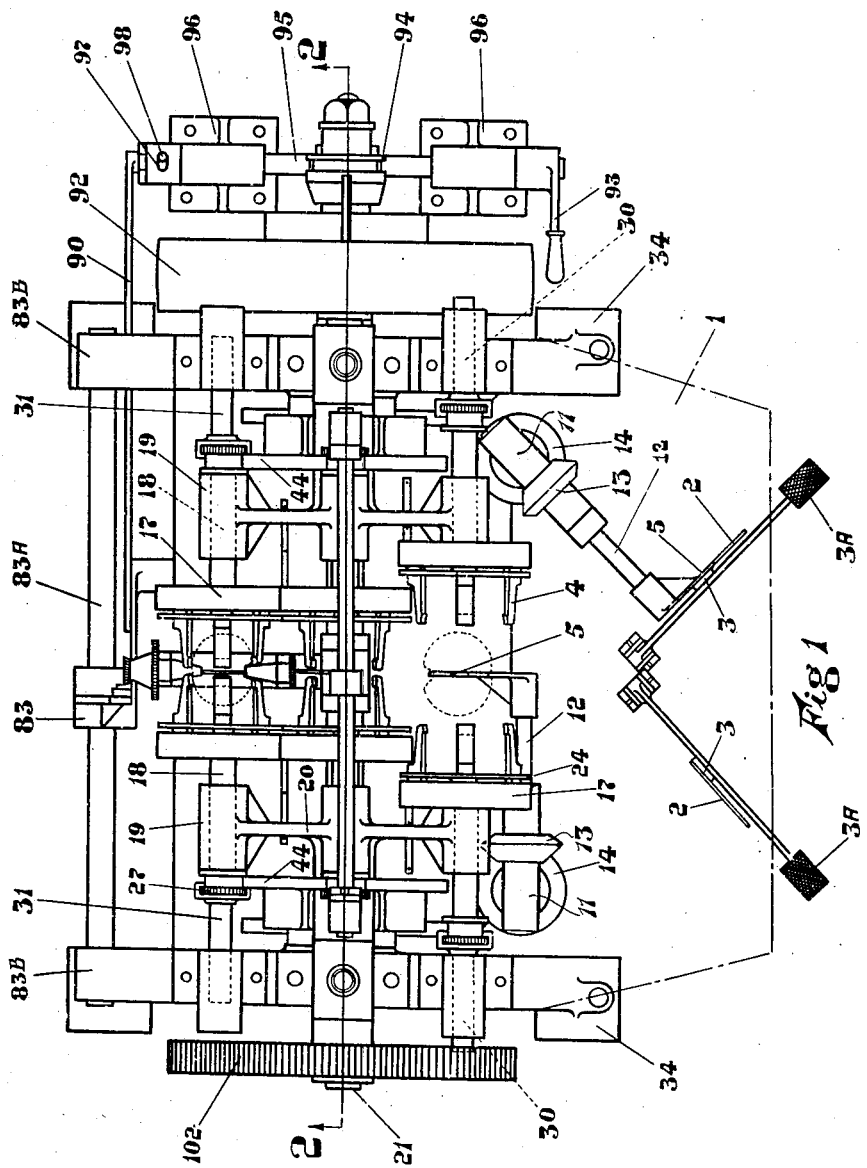
INVENTORS
ARTHUR T. TOTTENHAM
ALBERT S. RIDLEY
BY
ATTY.

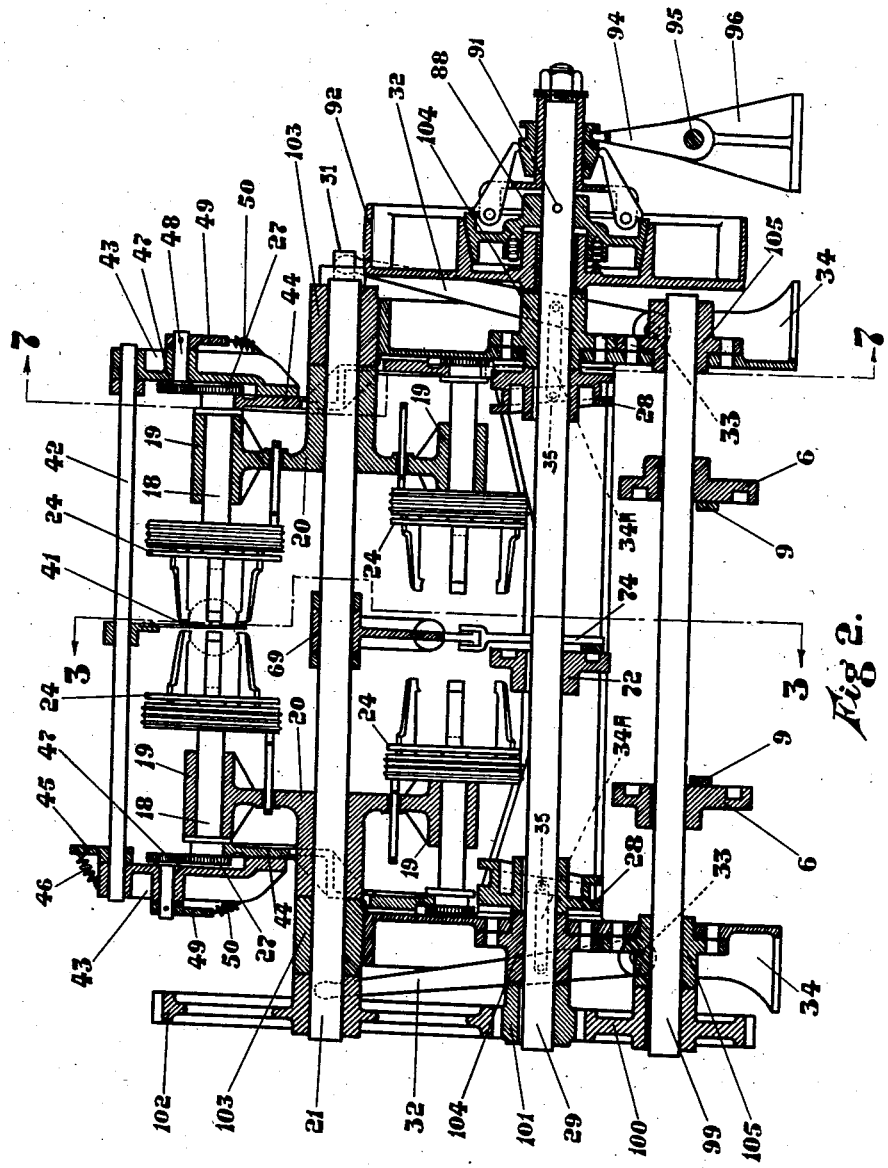

Sept. 3, 1929.   A. T. TOTTENHAM ET AL   1,726,685
FRUIT PITTING MACHINE
Filed Jan. 20, 1927   7 Sheets-Sheet 3
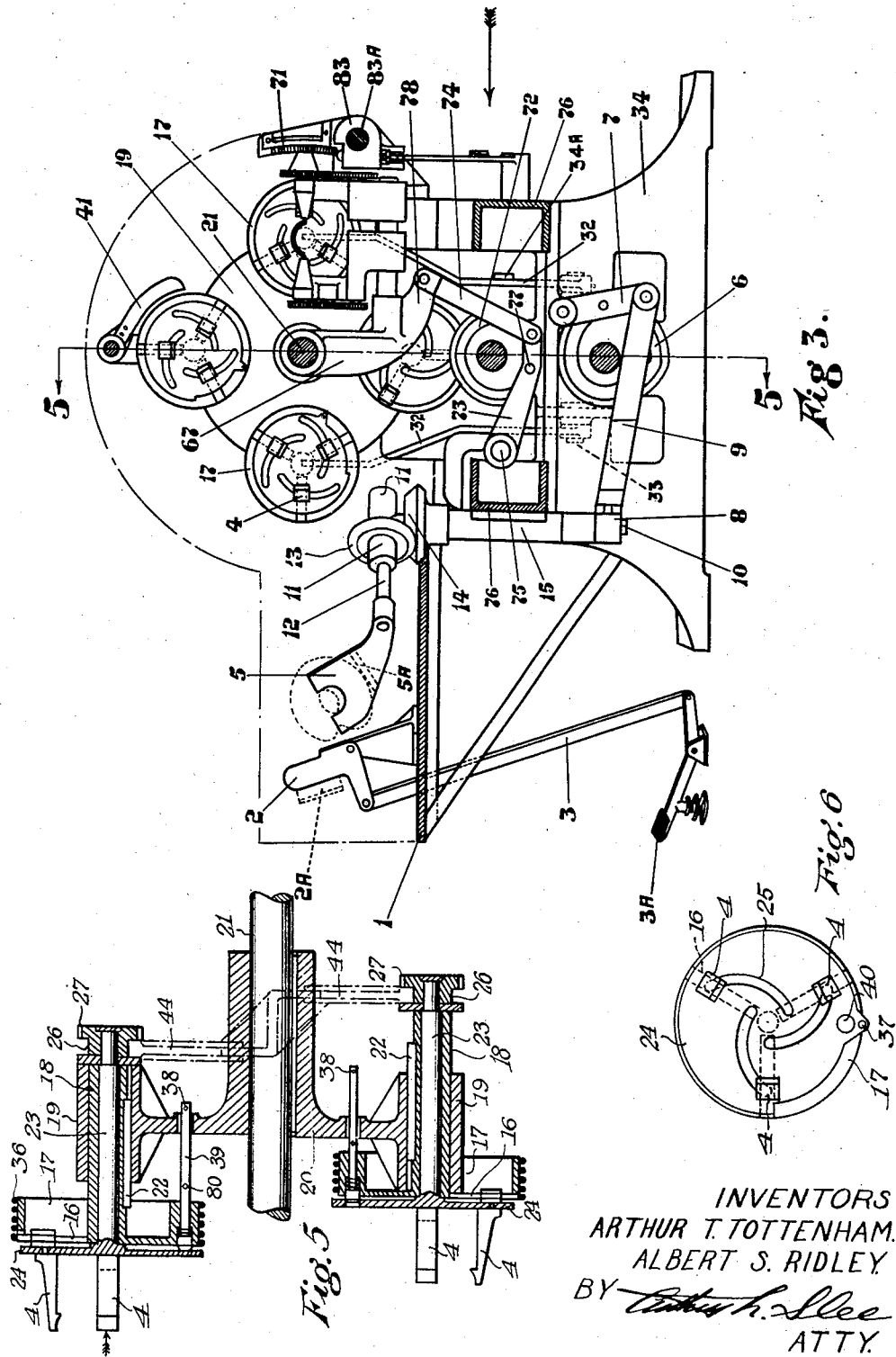
INVENTORS
ARTHUR T. TOTTENHAM.
ALBERT S. RIDLEY
BY
ATTY.

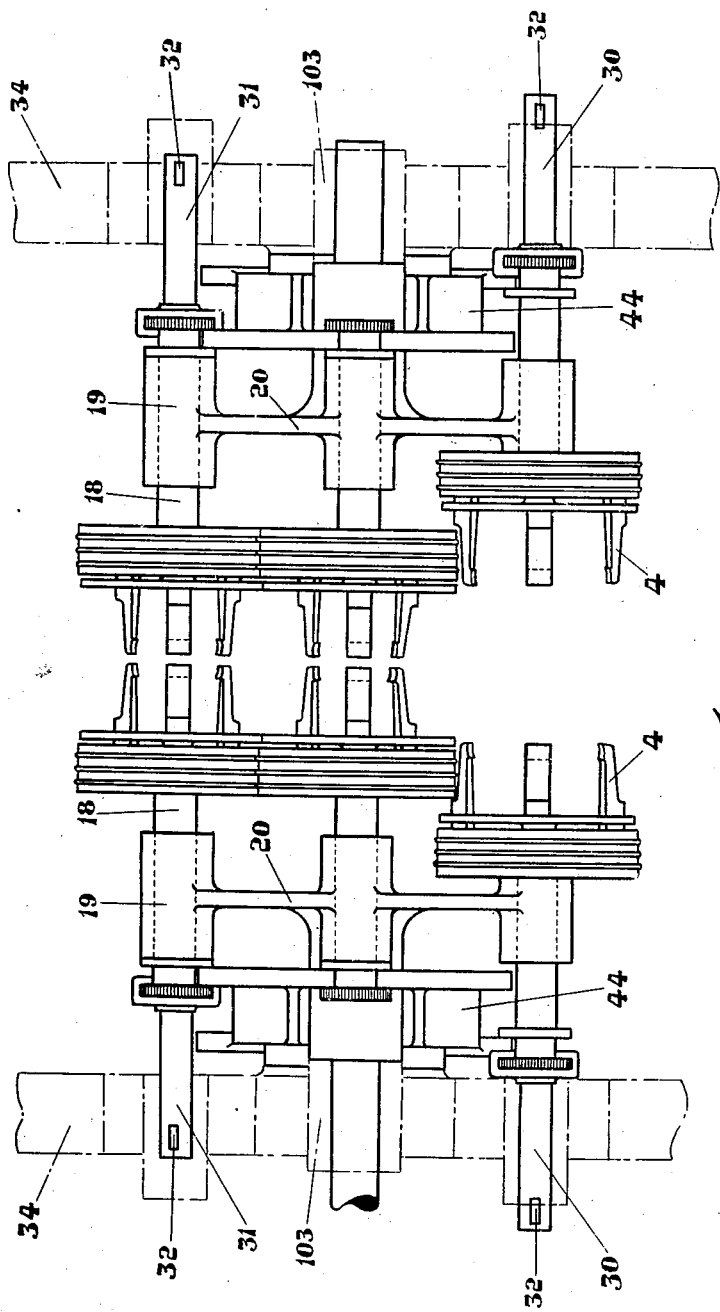

Sept. 3, 1929.  A. T. TOTTENHAM ET AL  1,726,685
FRUIT PITTING MACHINE
Filed Jan. 20, 1927   7 Sheets-Sheet 7
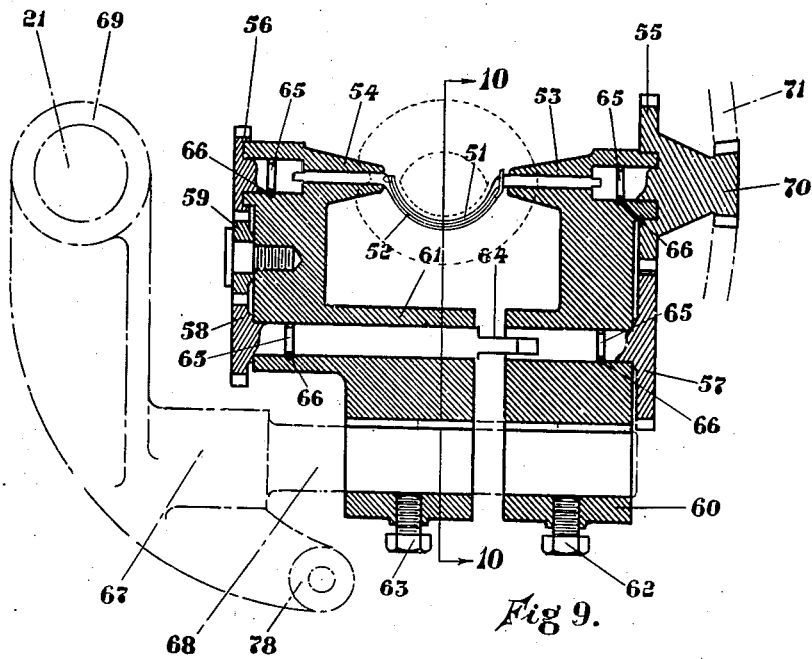
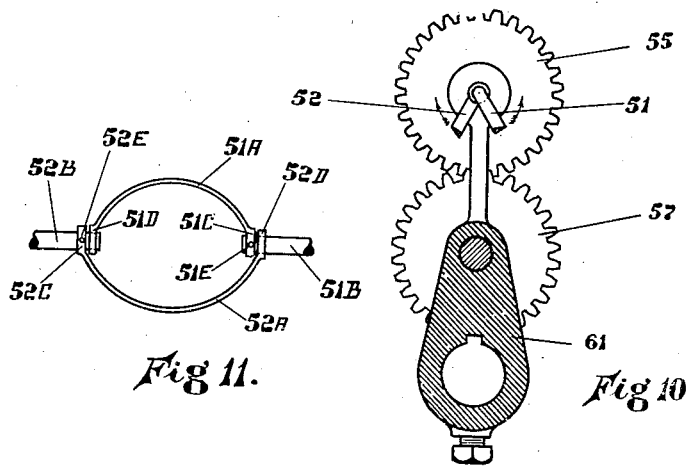
INVENTORS
ARTHUR T. TOTTENHAM.
ALBERT S. RIDLEY.
BY
ATTY.

Patented Sept. 3, 1929.

1,726,685

UNITED STATES PATENT OFFICE.

ARTHUR TALBOT TOTTENHAM, OF MERRIGUM, NEAR KYABRAM, AND ALBERT STANLEY RIDLEY, OF MELBOURNE, VICTORIA, AUSTRALIA, ASSIGNORS TO AUSTRALASIAN MACHINES PROPRIETARY LIMITED, OF MELBOURNE, AUSTRALIA.

FRUIT-PITTING MACHINE.

Application filed January 20, 1927, Serial No. 162,308, and in Australia April 7, 1926.

Our invention relates to improvements in machines for removing the pits from peaches and other drupaceous fruits and the cores from quinces and similar fruits; and the objects of our improvements are, first, to provide gripping fingers which are automatically adjustable to the size of the fruit; second, to enable the two halves of the flesh to be held in correct alignment in juxtaposition to each other and to the pit until the whole pit has been completely severed from the flesh by rotary pitting means; third, to afford facilities for the rapid replacement of damaged rotary pitting blades by fresh blades; fourth, to afford facilities for the rapid replacement of rotary pitting blades by blades of another size; fifth, to balance the forces acting on the fruit during the severing of the pit from the flesh; sixth, to provide facilities for the immediate dropping of the severed pit from the pitting means; seventh, to prevent puncturing, bruising or squashing of the halves of the flesh.

We attain these objects by the mechanism illustrated in the accompanying drawings, in which—

Figure 1 is a plan of the machine on a reduced scale, the feeding table being indicated in chain-dotted lines.

Figure 2 is a cross-section on the line 2—2 in Figure 1.

Figure 3 is a sectional elevation on line 3—3 of Figure 2, a cover being indicated in chain-dotted lines.

Figure 4 is a plan, on a slightly larger scale than the preceding figures, of the gripping fingers and associated parts in correct position, portion of the frame of the machine being shown in chain-dotted lines.

Figure 5 is a section through two half-sets of gripping fingers on the line 5—5 of Figure 3 but on a slightly larger scale, one half-set being in top position and the other in bottom position and some other portions of the machine being omitted.

Figure 6 is an elevation of a half-set of gripping fingers looking in the direction of the arrow in Figure 5.

Figure 9 is a sectional elevation through the pitter bracket and is approximately half the size of normal construction, the pivoted supporting arm and portion of the rack being shown in chain-dotted lines.

Figure 10 is a section on line 10—10 of Figure 9 but showing the pitting blades partially rotated, the arrows indicating the direction of the cutting movement of each blade.

Figure 11 is a plan showing an alternative construction of pitting blades with the blades partially rotated.

Figure 7:
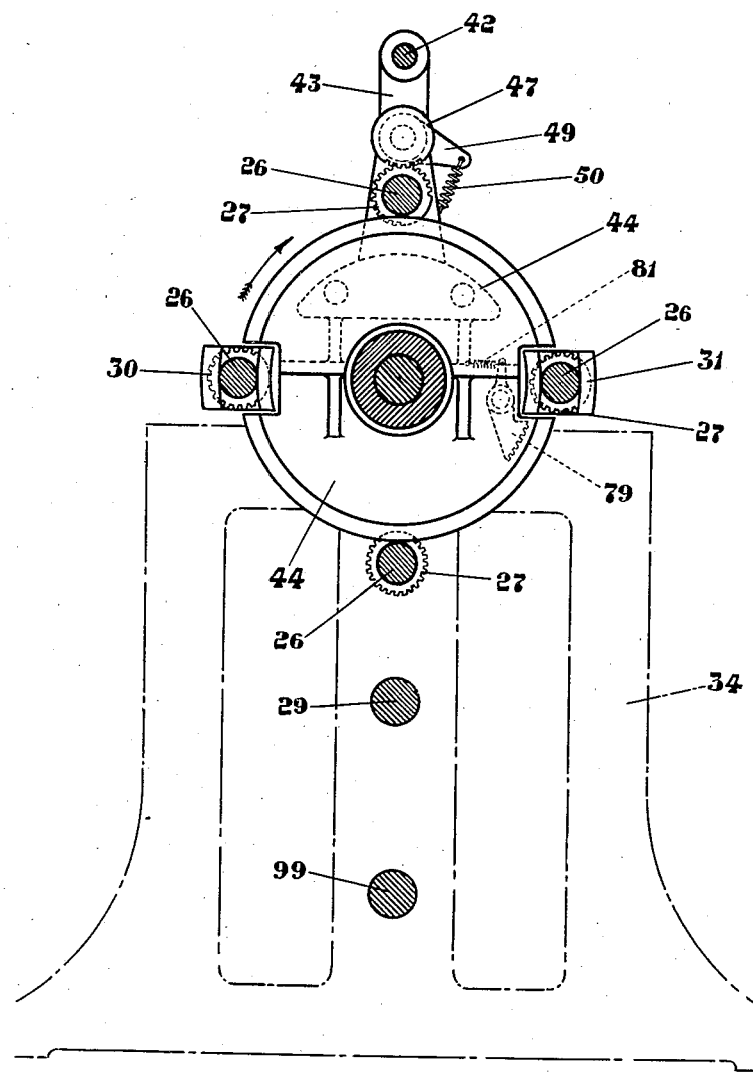
Figure 7 is a sectional elevation on the line 7—7 of Figure 2 but on a slightly larger scale, illustrating the auxiliary grip-tightening pinions and the grip-opening rack, some other portions of the machine being omitted and the frame being shown in chain-dotted lines.

The means for separating and conveying the fallen pits and halves of the flesh are not shown as they may be of any known practical construction.

For simplicity of description the construction of the preferred specific form of the machine and its mode of operation will now be described together. To facilitate the understanding of the operation fruit is shown in dotted lines in some portions of the figures. As the pitting blades according to this invention are normally rotated through half a revolution during pitting the term "rotary" is intended to include "semi-rotary."

The fruit is supplied to a table 1 either manually or by conveyors and each table normally is adapted to accommodate two operatives. Each fruit is pushed down by an operative on to a hinged receiving knife 2 which is then oscillated by a link 3 and pedal 3A so that the fruit is pressed down on to a U-shaped cutter-carrier 5 which severs the lower half of the flesh right up to the pit. Skilled operatives may place the fruit directly on to the cutter-carrier. If quinces are to be treated a stop 2A may be provided on the receiving knife and a similar stop 5A may be provided on the cutter-carrier as shown in dotted lines in Fig. 3 to facilitate the correct positioning of the fruit; but in the case of peaches and like fruit the fruit itself acts as a stop. The cutter-carrier with the fruit held thereon is swung forwardly and partly rotated about its longitudinal axis into a position where the fruit is automatically seized by two opposed half-sets of gripping fingers 4. As the cutter-carrier on one side of the table moves forwardly into position, a duplicate cutter-carrier on the other side of the table moves back into the feeding position where it is fed by a duplicate hinged receiving knife oscillated by a duplicate link and pedal actuated by the second operative. These movements of the cutter-carriers are effected by means of feeding cams 6 (Figs. 2 and 3), keyed to a bottom shaft 99 and positioned one on each side of the machine, which each operate a hanging link 7 connected to a lever 8 through a link 9. This lever 8 is secured to the lower end of a vertical feeding shaft 10 which carries at its upper end a T-shaped bracket 11. The horizontal boss of this bracket 11 is bored to form a bearing for a spindle 12 supporting the cutter-carrier 5. The other end of this spindle is provided with a gear-wheel 13 which is keyed thereon. This gear-wheel meshes with a stationary gear-wheel 14 mounted on the top of the vertical bearing 15 of the feeding shaft 10. The abovedescribed feeding parts are arranged in duplicate with one set on each side of the machine. Rotation of a feeding cam 6 causes its feeding shaft 10 and bracket 11 to oscillate forwards and backwards between the feeding and fruit-gripping positions. During this swinging movement the meshing of the gear-wheels 13 and 14 produces a partial rotation of the cutter-carriers about the axis of the spindle 12 so that the fruit projects forwardly from its cutter-carrier when it is being seized by the gripping fingers 4. Four or any other preferred number of sets of gripping fingers are carried on each side of the machine. Each half-set comprises three or other number of radially movable fingers. These fingers in each half-set are slidably carried in slots 16 in a guiding drum 17 which is provided with an extended hollow spindle 18, each of these spindles being slidably carried in one of a series of bosses 19 on a disc wheel 20, one such disc wheel being positioned on each side of the machine and driven by the top shaft 21. These spindles 18 are each provided with a feather 22 or like means to prevent their rotation within the bosses 19. Each of these hollow spindles 18 accommodates a spindle 23 carrying at one end a cam plate 24 provided with curved slots 25 (Fig. 6) through which the gripping fingers pass. The other end of the spindle 23 is extended and secured to a grooved guiding collar 26, the outer edge of which is provided externally with teeth 27 over a portion of its periphery for a purpose hereinafter described.

The inward lateral movement of the half-sets of gripping fingers is effected by means of a cam 28 on the main driving shaft 29 at each side of the machine. This cam operates a plunger 30 and the same cam is utilized for operating in the same manner an extractor 31 by which the half-sets of fingers are drawn apart when the pitting is completed. The inner end of each plunger and extractor is formed in the shape of a claw, so as to accommodate the grooved guiding collars 26, and the outer end of each is provided with a slot to accommodate a vertical lever 32. This lever 32 is pivoted at 33 on the frame 34 of the machine. Movement is given to the lever 32 and thus to the plunger and extractor by a connecting link 34A, one end of which is pivotally connected to the lever 32 and the other end of which is provided with a roller 35 which works in the groove of cam 28 so that the rotation of the driving shaft causes the half-sets of gripping fingers to move inwardly and outwardly as described. This lateral movement of the half-sets of gripping fingers simultaneously results in a radial movement of the gripping fingers so that the fruit is either gripped or released as the case may be. The inward radial movement of the gripping fingers is effected by a spring 36 coiled around the outside of the drum 17. One end of this spring is secured to the drum 17 and the other end is secured to a lug 37 on the cam plate 24. At a certain stage of the inward lateral movement of a half-set of gripping fingers a pin 38 strikes the outer face of the web of the disc wheel 20 so that as this half-set is moved further inwards a locking rod 39 is withdrawn from a hole 40 in the cam plate 24 and the latter is then rotated under the action of the spring 36. This rotation of the cam plate draws the fingers 4 radially inward under the combined action of the curved slots 25 of the cam plate and the radial slots 16 of the guiding drum. The fingers are thus pressed radially inwards so that their tips grip the fruit firmly. These tips will be shaped and surfaced to facilitate gripping. In this gripping position the tips of the laterally opposed fingers are relatively close to each other. The fruit is then carried around by the rotation of the disc wheels and the uncut half of the flesh is now severed right up to the pit by means of a hanging blade 41 which is suspended from a rod 42 carried on brackets 43 mounted on a pair of guiding discs 44. Secured to the rod 42 is a lever 45, the end of which is attached to a spring 46, the other end of the spring being secured to the bracket 43. Should the fingers grip the fruit insufficiently, the auxiliary tightening means comes into operation. This means consists of a pinion 47 having an extended shank 48, carrying at its other end a lever 49 which is controlled by a spring 50 so as to exert a regulated pressure on the cam plate 24 by means of the teeth 27. The fruit-gripping mechanism with its associated parts above described is, of course, duplicated on the other side of the machine, as shown on the drawing. The further rotation of the disc wheels carries the fruit into the pitting position at the rear of the machine and diametrically opposite the feeding table. As the fruit approaches this position curved pitting blades 51 and 52 enter the slit in the flesh of the fruit and when the actual pitting position is reached these pitting blades are adjacent to the pit of the fruit. The bearings 53 and 54 which accommodate the shanks of the blades 51 and 52, respectively, are tapered towards the blades so that the inner tips of these bearings which enter the slit in the fruit are only slightly wider than the blades and therefore do not crush the flesh. The only parts of the pitting mechanism which enter the slit are the narrow curved pitting blades and these narrow tips of the bearings. This is rendered practicable, firstly, by the utilization of two blades rotating in opposite directions so that the fruit tends to centralize itself and the forces act in such a manner that the fruit is kept from revolving about the axis of the shanks of the pitting blades, and, secondly, by the method of holding the fruit firmly between opposed half-sets of gripping fingers with the two halves of the fruit in correct alignment in juxtaposition to each other so that no slipping of the fruit occurs when the pitting blades are semi-rotated. After each half rotation one blade nests closely within the other. For these reasons no retaining means need be inserted in the slit to prevent movement of the fruit during pitting and consequently, the fruit is cleanly cut and its cut surfaces are not squashed in any way which is important as the good appearance of the halved and pitted fruit is essential in canning. The slit is formed of sufficient width to accommodate the curved pitting blades by correctly proportioning the flesh-severing blade 41. This blade does not squash the flesh of the fruit while it is severing it because the construction of the gripping fingers allows the flesh of each half of the fruit to be pushed back under the gripping fingers to a slight extent and further the slit is thus held sufficiently open to allow the narrow pitting blades to enter. This is possible because the fruit is gripped at a few points only and not all the way round. Another advantage of this pitting mechanism is that there is no necessity to turn the fruit therein and the upper half of the slit through the flesh may be of a very small width as the pitting mechanism does not enter that portion of the slit. The shanks of the blades 51 and 52 may be tongued, fluted, squared or otherwise shaped or roughened at their outer ends so as to allow them to be firmly and removably fitted in, or gripped by, the shanks of driving gears 55 and 56. The gear wheel 56 is driven from the gear wheel 55 through a train of gears 57, 58 and 59 so that the gear wheels 55 and 56 are adapted to rotate in opposite directions to each other.

According to the modified form of pitting blades shown in Fig. 11, the blades 51A and 52A are made separately from the shanks 51B and 52B to facilitate their manufacture and replacement. Each blade may be enlarged and bored at the ends 51C, and 52C, respectively, and thus secured to its shank by pins 51E and 52E, or other known means of attachment may be used. The opposite ends 51D and 52D of the blades are enlarged and bored so as to fit rotatably on the shanks. In this alternate form the blades may be replaced by springing their ends inwards without adjustment of the pitting bracket.

To facilitate the rapid replacement of broken blades by fresh blades, the pitting bracket is made in two pieces 60 and 61 which can be drawn apart to release the blades and then returned to position when fresh blades have been inserted. If it is desired to treat fruit having pits of different sizes from those for which the machine is set at any time, the two pieces of the bracket may be set at different distances from each other so as to accommodate pitting blades of various sizes. The pieces of the bracket may be set in these positions by set screws 62 and 63. The shaft of the intermediate gear is provided with a tongue and groove connection 64 as shown. To hold these gear wheels in position their shanks and shafts are respectively provided with annular grooves 65 which accommodate tangential retaining pins 66.

Figure 8:
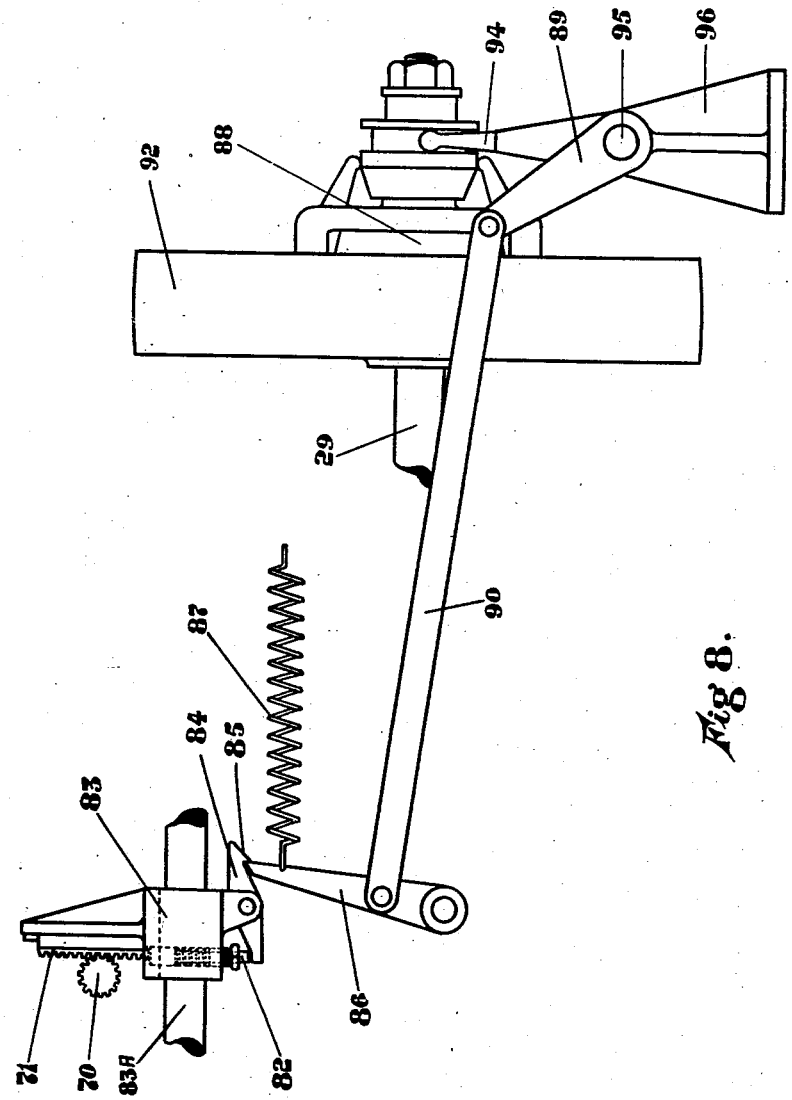
Figure 8 is an enlarged view of the rack for operating the pitter mechanism together with associated emergency stop mechanism, looking in the direction of the large arrow in Fig. 3.

The whole of the pitting mechanism is carried by a pivoted supporting arm 67, the two pieces of the bracket being slidably carried on a shank 68 offset from this supporting arm. The supporting arm is provided with a boss 69 at its upper end which is bored to fit on to the top shaft 21 and is positioned on the centre line of the machine. As soon as the fruit reaches the pitting position the pitting bracket is moved downwards at the same rate as the fruit until the pitting blades have each completed slightly more than half a revolution. This is accomplished by a gear wheel 70 meshing with a rack 71. This gear 70 is an extension of the gear 55. The movement of the supporting arm 67 and pitting bracket is controlled by a pitting cam 72, lever 73 and link 74. This lever 73 is pivoted at 75 to a cross-beam 76 of the machine and is actuated by a roller 77 which works in a groove of the pitting cam 72. The extreme end of lever 73 is connected to the link 74, the other end of which is connected to a projection 78 on the supporting arm 67. When the pitting mechanism has reached the limit of its downward movement each blade has travelled slightly more than half way around the pit and the halves of the flesh have been completely severed from each other and from the pit. The half-sets of fingers while still holding the halves of the flesh, are now drawn apart laterally by the extractor means previously described herein and the pit is allowed to drop and pass to a dump. The provision of the large open space below the pitting blades is an important feature of the machine as it facilitates the free passage of the pits and minimizes the risk of blockage of the pitting mechanism. The gripping fingers are next opened radially as the half-sets are carried round by the disc wheels. This radial opening of the gripping fingers is effected by means of a pivoted quadrant 79 which meshes with the teeth 27 and thus rotates the cam plate 24 until the hole 40 in said cam plate comes into alignment with locking rod 39. At this position a pin 80 on the locking rod 39 strikes the inner face of the web of the disc wheel 20 and forces the end of the locking rod into hole 40 and thus locks the fingers in their open position. The pivoted quadrant 79 is provided with a spring 81 which holds the teeth of the quadrant in mesh with the teeth 27 until the fingers have reached their etxreme outward radial position. When the fingers reach this extreme position the teeth 27 have been turned by rotation of the guiding collar 26 and cam plate 24 to an extent sufficient to bring them out of mesh with the teeth of the quadrant 79. The latter then ride over the untoothed portion of the collar 26 or the collar 26 may be cut away at this point to allow free passage of the untoothed portion of the collar past the toothed quadrant. As the fingers open radially the halves of the flesh fall on to a chute or any other known suitable form of collecting or conveying means. To facilitate the separation of the pits from the halves of the fruit, shaking screens, trommels or other separating means may be provided. In the event of a fruit being placed in the machine in an incorrect position and the pitting blades thereby fouling the pit, an emergency stop mechanism (shown in Fig. 8) is brought into operation to prevent damage to the machine. The pressure brought to bear on the pitting blades by such fouling is transmitted to the teeth of gear 70 and then through the rack 71 and a spring-pressed plunger 82 immediately beneath it. This plunger 82 is housed in a bracket 83 which also carries the said rack. The bracket 83 is mounted on a supporting arm 83A carried by brackets 83B on the frame. Pivoted on the under side of the bracket 83 is a pawl 84, one end of which is operated by the plunger 82 and the other end is formed in the shape of a hook 85 which normally holds a spring-pulled lever 86 but releases it when the plunger 82 is depressed. When this lever 86 is released, the spring 87 pulls it laterally and disengages the starting clutch 88 through the medium of a lever 89 and link 90. Consequently the machine is automatically stopped as soon as a pitting blade becomes fouled.

A further emergency stop device is provided in case of any blockage of any other moving parts of the machine. Such device comprises a relatively soft metal pin 91 connecting the driving shaft 29 to the clutch 88. This pin will break under any abnormal strain and is readily renewable.

The clutch drum is formed integrally with the main driving wheel 92.

In order to start the machine, in the normal case of a belt-driven machine, the flywheel 92 runs loose until the clutch is thrown into operation by a hand-lever 93 actuating a forked clutch-lever 94 through a shaft 95 which is supported on brackets 96. To enable the machine to be stopped without interfering with the emergency stop mechanism, a slot 97 is provided in the lever 89 to accommodate a pin 98 which is secured to the shaft 95 and thus allows this shaft to be operated by the hand-lever 93 without moving the lever 89.

The machine is actuated from the main driving shaft 29 through a pinion 101 keyed to one end of that shaft and meshing with a gear wheel 102 which is keyed to the top shaft 21, while the bottom (or feeding) shaft 99 is driven by means of a pinion 100 meshing with the pinion 101. Bearings 103 are mounted on the top of the frame 34 to carry the top shaft 21, while bearings 104 and 105 are attached to the side of the frame to carry the shafts 29 and 99, respectively.

We claim:

1. A fruit pitting machine comprising feeding means; oppositely disposed sets of fruit gripping fingers arranged to receive fruit from the feeding means; means for automatically moving the gripping fingers radially to yieldably grip opposite halves of the fruit simultaneously from opposite sides; means for halving the flesh around the pit of each piece of fruit while held by the gripping fingers; and means for severing the pit from the flesh while held in natural relation by the gripping fingers.

2. A fruit pitting machine comprising feeding means; oppositely disposed sets of radially movable fruit gripping fingers arranged to be yieldably moved simultaneously to automatically grip opposite halves of fruit carried thereto by the feeding means; flesh cutting means; pitting means for severing the pit from each piece of fruit; and means for moving the gripping fingers to carry the fruit from the feeding means to the flesh cutting and pitting means, said gripping fingers being arranged to maintain the halves in natural relation during the cutting and pitting thereof.

3. A fruit pitting machine comprising feeding means; a pair of spaced parallel gripper carriers; a plurality of sets of gripping fingers slidably mounted upon each carrier, the fingers of one carrier being disposed opposite to the fingers of the other carrier; means for simultaneously moving opposite sets of fingers radially to grip and maintain opposite halves of each piece of fruit in natural relation; flesh cutting means; pit removing means; and means for actuating the carriers to move the fruit from the feeding means to the flesh cutting and pitting means.

4. A fruit pitting machine comprising feeding means; a pair of spaced parallel gripper carriers; a plurality of gripper mounting members slidably mounted in opposing pairs upon the carriers, said mounting members being simultaneously movable in opposite directions; a set of radially movable fingers slidably mounted upon each mounting member; means for moving the fingers radially into gripping engagement with opposite halves of each piece of fruit to hold said halves in natural relation; flesh cutting means; pit removing means; and means for actuating the carriers to move the fruit from the feeding means to the flesh cutting and pitting means.

5. A fruit pitting machine comprising feeding means; a pair of spaced parallel carriers; a plurality of gripper mounting members slidably mounted upon the carriers, the members of one carrier being disposed directly opposite the members of the opposite carriers and arranged to move simultaneously in opposite directions relative thereto; a set of radially movable gripping fingers mounted upon each mounting member; a cam plate mounted in connection with each mounting member and arranged to move the fingers radially into gripping engagement with opposite halves of the fruit to hold the halves in natural relation; flesh cutting means; pit removing means; and means for actuating the carriers to move the fruit from the feeding means to the flesh cutting and pitting means.

6. A fruit pitting machine comprising feeding means; a pair of spaced parallel gripper carriers; a plurality of radially slotted gripper mounting members mounted upon each carrier, the members of one carrier being disposed directly opposite the members of the opposite carrier and arranged to be moved axially simultaneously in opposite directions relative thereto; a set of gripping fingers slidably mounted within the slots of each mounting member; a cam plate mounted adjacent each mounting member and arranged to move the fingers radially into gripping engagement with opposite halves of the fruit to hold said halves in natural relation; flesh cutting means; pit removing means; and means for actuating the carriers to move the fruit from the feeding means to the flesh cutting and pitting means.

7. A fruit pitting machine comprising feeding means; a pair of spaced parallel gripper carriers; a plurality of radially slotted gripper mounting members slidably mounted upon each carrier, the members of one carrier being disposed directly opposite to the members of the other carrier and arranged to be moved axially simultaneously in opposite directions relative thereto; a set of gripping fingers slidably mounted within the slots of each mounting member; a cam plate mounted adjacent each mounting member and having spiral grooves engaging the gripping members; yieldable means for actuating the cam to move the fingers radially into gripping engagement with opposite halves of the fruit to hold said halves in natural relation; flesh cutting means; pit removing means; and means for actuating the carriers to move the fruit from the feeding means to the flesh cutting and pitting means.

8. A fruit pitting machine comprising feeding means; a pair of spaced parallel rotatable gripper carriers; a plurality of radially slotted gripping members slidably mounted upon each carrier, the members of one carrier being disposed directly opposite to the members of the opposite carrier; cam means for moving the mounting members in pairs axially toward and away from each other in timed relation to the rotation of the carrier; a set of gripping fingers slidably mounted within the slots of each mounting member; a cam plate mounted adjacent each mounting member and having spiral slots engaging the fingers; yieldable means for actuating the cam plate to move the fingers radially into gripping engagement with opposite halves of the fruit to hold said halves in natural relation; flesh cutting means; pit removing means; and means for actuating the carrier to move the fruit from the feeding means to the flesh cutting and pitting means.

9. A fruit pitting machine comprising feeding means; gripping means arranged to receive fruit from the feeding means; flesh cutting means; and pitting means comprising an arm, pitter brackets mounted upon the arm, a pair of curved pitting knives rotatably mounted upon the brackets, said knives being arranged to enter a slit cut in the flesh of the fruit in nested relation, and means for rotating the knives simultaneously in opposite directions to sever the pits from the fruit.

10. A fruit pitting maching comprising feeding means; gripping means arranged to receive fruit from the feeding means; flesh cutting means; and pitting means comprising a supporting arm, pitter brackets mounted upon the arm and provided with relatively adjustable bearing portions, pitting knives mounted upon the adjustable bearing portions, and means for rotating the pitting knives to sever the pits from the fruit.

11. A fruit pitting machine comprising feeding means; gripping means arranged to receive fruit from the feeding means; flesh cutting means; and pitting means, comprising a supporting arm, relatively adjustable pitting brackets mounted upon the arm, a pair of curved pitting knives mounted upon the brackets, said knives being arranged to enter a slit cut in the flesh of the fruit in nested relation, and means for rotating the knives simultaneously in opposite directions to sever the pits from the fruit.

12. A fruit pitting machine comprising feeding means; rotatable gripping means arranged to receive fruit from the feeding means; flesh cutting means; and pitting means comprising an oscillating supporting arm; pitting knives mounted upon the supporting arm; and means for actuating the pitting knives to sever the pit from the fruit, said knives being carried along an arcuate path coinciding with the path of fruit carried by the gripping means and at the same rate during the pitting operation.

13. A fruit pitting machine comprising feeding means; rotatable gripping means arranged to receive fruit from the feeding means; flesh cutting means; and pitting means comprising an oscillating supporting arm; relatively adjustable pitting brackets mounted upon the arm; pitting knives mounted upon the brackets; and means for actuating the pitting knives to sever the pit from the fruit, said knives being carried along an arcuate path coinciding with the path of the fruit carried by the gripping means and at the same rate during the pitting operation.

14. A fruit pitting machine comprising feeding means; rotatable gripping means arranged to receive fruit from the feeding means; flesh cutting means; and pitting means comprising an oscillating supporting arm; relatively adjustable pitting brackets mounted upon the arm; a pair of curved pitting knives mounted upon the brackets, said knives being arranged to enter a slit cut in the flesh of the fruit in nested relation and to be carried along an arcuate path coinciding with the path of the fruit carried by the gripping means and at the same rate; and means for rotating the knives simultaneously in opposite directions to sever the pits from the fruit.

15. In a fruit pitting machine, fruit gripping means comprising oppositely disposed sets of radially movable fingers; and means for moving the sets simultaneously to engage and disengage fruit.

16. In a fruit pitting machine, fruit gripping means comprising oppositely disposed sets of radially movable fingers; and yieldingly rotatable means for moving the fingers to engage and disengage pieces of fruit.

17. In a fruit pitting machine, a pair of curved pitting knives arranged to enter a slit cut in a piece of fruit in nested relation upon one side of the pit; and means for rotating the knives simultaneously in opposite directions around the pit of said fruit to nested relation upon the opposite side of the pit to sever the pit from the fruit.

18. In a fruit pitting machine, feeding means comprising an oscillating arm; a carrier knife pivotally mounted upon the arm; and means for moving the knife and fruit carried thereon into the path of fruit gripping means.

19. In a fruit pitting machine, feeding means comprising an arm; a carrier knife pivotally mounted upon the arm; and means for oscillating the arm and simultaneously oscillating the knife upon said arm to carry fruit applied upon the knife from a receiving position into the path of fruit gripping means.

20. In a fruit pitting machine, the combination with feeding means, gripping means, flesh cutting means, and pitting means, of a pitting rack; means slidably supporting the pitting rack in normal operative position; a spring holding said rack against normal pressure; a releasing pawl operated by movements of said rack when subjected to excessive pressure; a driving clutch; and means releasing said driving clutch when said pawl is moved.

In testimony whereof we affix our signatures.

ARTHUR TALBOT TOTTENHAM.
ALBERT STANLEY RIDLEY.